2 Sheets—Sheet 1.
C. WHIPPLE.
Machine for Shaving Heads of Wood Screws.
No. 685. Reissued April 12, 1859.
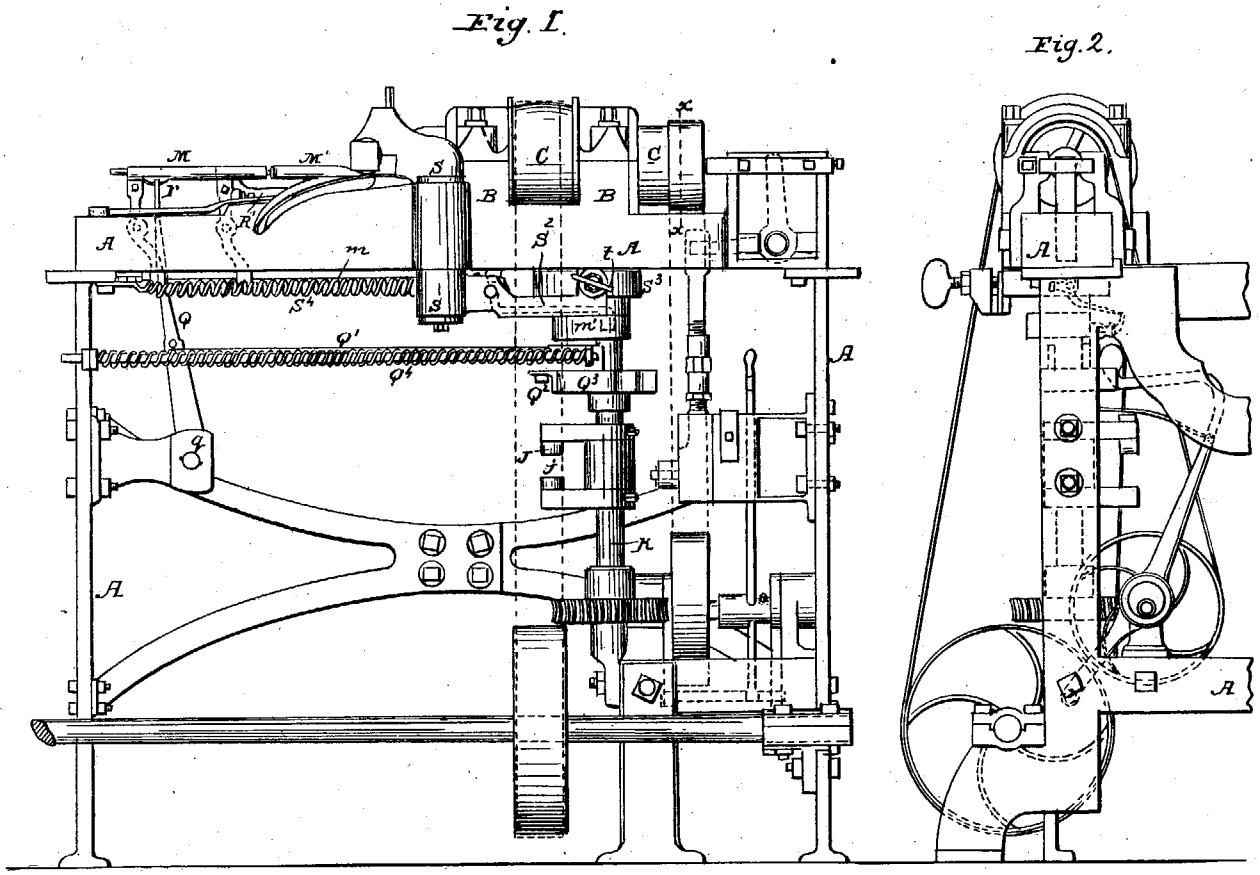
N. PETERS, Photo-Lithographer, Washington, D. C.

2 Sheets—Sheet 2.
C. WHIPPLE.
Machine for Shaving Heads of Wood Screws.
No. 685. Reissued April 12, 1859.
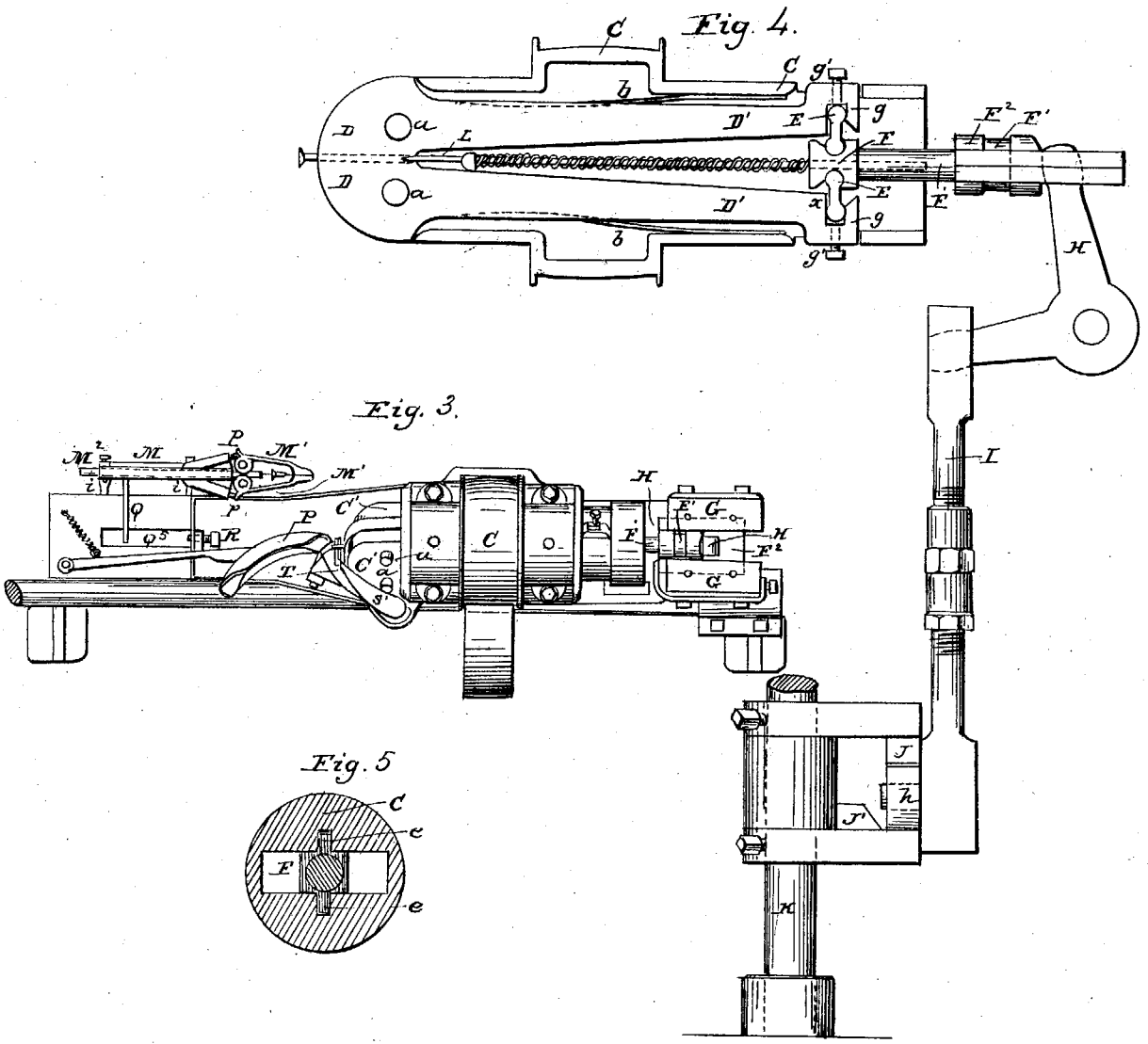
N. PETERS, Photo-Lithographer, Washington, D. C.

UNITED STATES PATENT OFFICE.

CULLEN WHIPPLE, OF PROVIDENCE, RHODE ISLAND, ASSIGNOR TO THE NEW ENGLAND SCREW COMPANY.

IMPROVEMENT IN MACHINERY FOR MAKING WOOD-SCREWS, &c.

Specification forming part of Letters Patent No. 9,460, dated December 7, 1852; antedated June 7, 1852; Reissue No. 685, dated April 12, 1859.

DIVISION B.

*To all whom it may concern:*

Be it known that CULLEN WHIPPLE, of the city and county of Providence and State of Rhode Island, has invented a new and useful Improvement in Machinery for the Manufacture of Wood-Screws, of which the following is a full, clear, and exact description, reference being had to the annexed drawings, which make part of this specification, and in which—

Figure 1 represents a side elevation, Fig. 2 an end elevation, and Fig. 3 a plan, of a machine for shaving the heads of wood-screws (complete, with the exception of the hopper and its adjuncts) showing one application of said improvement. Fig. 4 represents, on an enlarged scale, the mandrel in section, together with an elevation of the mechanism connected therewith for holding and liberating and for discharging the blank; and Fig. 5 represents a transverse section through the rear of the mandrel at the line *x x* of Fig. 1.

The invention which is the subject of this patent consists of a mechanism for chucking screw-blanks, one at a time, dressing them, and discharging them from the chuck when dressed, which is capable of receiving and operating upon blanks of different lengths.

The machine represented in the accompanying drawings consists, mainly, of a hollow mandrel; of a pair of gripping-jaws, carried by the mandrel, which grasp the blank, hold it while being dressed by a cutter, and liberate it when dressed; of a reciprocating tool-holder which carries the tool forward to dress the head of the blank and withdraws it when the head is dressed; of a feeding-trough which receives the blank from a hopper, and is traversed by a rod which pushes the blank from the trough into the jaws of the mandrel; of mechanism for closing the jaws of the mandrel upon the blank to hold it while being dressed; of mechanism for discharging the dressed blank when it is liberated from the grasp of the jaws; of shafts, with pulleys, cams, and other mechanism to give motion to the several acting members of the machine, and of a frame to support the several parts of this mechanism.

Upon a bench, A, two puppet-heads, B B, are secured, which support the revolving mandrel C in suitable bearings. That portion of the mandrel between the puppet-heads is enlarged and turned into the proper form to act as a pulley for the belt which gives it motion. This mandrel carries the gripping-nippers D D, which are supported between a pair of lugs, C′ C′, that project from the front extremity of the mandrel and are secured there by joint-pins *a a*, which pass through the lugs and the nippers. The shanks D′ D′ of the nippers are made long to give them considerable elasticity, extend to near the rear end of the mandrel, and are forced toward each other by springs *b b* to keep the jaws open when not grasping a blank. The jaws are shut by forcing the shanks apart, which is effected in this instance by means of a pair of toggles, E E, diverging from a central block, F, which has two arms, *e e*, that slide in grooves in the mandrel to guide the block. This block forms the head of a bar, F′, whose axis is in line with that of the mandrel, and whose hinder extremity is swiveled to a cross-head, $F^2$, between a pair of standards, G G, on the hinder extremity of the bench A. The inner sides of these standards have grooves on a level with and parallel to the axis of the mandrel for the cross-head to slide in toward and from the end of the mandrel. The inner extremities of the toggles are seated in socket in the head F and their outer extremities in boxes *g g* in recesses in the hinder extremities of the nipper-shanks. By means of set-screws *g′ g′* in the shanks the boxes *g g* can be adjusted to make the toggles cause the jaws to approach within a greater or less distance of each other, as may be required for gripping blanks of different sizes and with varying degrees of pressure.

Beneath the cross-head $F^2$ an elbow-lever, H, is pivoted to the bench A. This lever is vibrated at intervals, and one of its arms entering a slot in the cross-head $F^2$ vibrates it, together with the bar F′ and the block F. The other arm of the lever enters a slot in the upper extremity of a bar, I, that slides up and down in suitable guides. The lower extremity of this bar carries an anti-friction wheel, *h*, journaled to its side within the range of two revolving cams, J J′, on the shaft K, which alternately elevate and depress it to raise and lower the bar I and to vibrate the bent lever H.

The horizontal bar F′, when moved backward, will flex the toggles E E and allow the springs *b b* to force the shanks of the nippers toward each other to open the jaws, and when the bar F′ is moved forward the toggles E E will be forced into a line with each other to separate the shanks D′ D′ and close the jaws upon the blank placed between them, by means hereinafter described.

The mechanism for discharging the blank after it is shaved consists of a rod or punch, L, whose front extremity is supported and guided in the same grooves in which the blank is held in the jaws. The hinder extremity of this rod is supported and guided in a socket in the head-block F. The punch is constantly pressed forward between the gripping-jaws with considerable force by means of a helical spring which is coiled on it between the collar or stop and the block F.

For the purpose of arresting the motion of the punch when discharging the blank at a point far enough within the outer ends of the grooves in the gripping-jaws to leave an opening for admitting the end of the blank and guiding it against the punch, a stop or collar is placed on the punch in such a position that when the front end of the punch has advanced to the point required the stop shall arrest its further advance by coming in contact with the inner end or shoulder of the jaws.

The feeding apparatus is placed immediately in front of the gripping-nippers. It consists of a stock, M, mounted on the upper extremities of a pair of arms, *i*, which project from a rock-shaft, *m*, at the side of the bench A. This shaft is operated by a cam, *m′*, and a spring, $Q^4$, in such manner as to vibrate the stock laterally from a position in line with the axis of the mandrel to another position at the side of the frame, where it passes under a hopper or other receptacle for the undressed blanks. On the front extremity of the stock M a pair of jaws, M′, are secured by means of pivots *o o*, on which they turn to open and shut. These jaws are constantly pressed together by spiral springs *p p*, inserted between an arm on each jaw, and a corresponding projection of the stock. The upper side of the jaws is hollowed or scooped out, so as to form a trough for the reception of a blank, and the adjacent faces of the front extremities of the jaws have semi-cylindrical grooves cut in them to form an aperture of sufficient size to allow the shank of a blank to pass through it. Behind the jaws M′, and in a line with the aperture through their front extremities, a hole is made through the stock M to admit and guide a rod or feeding-punch, $M^2$, which, when moved toward the jaws M′, will push the blank, shank foremost, out of the trough through the aperture in its front end. The jaws M′ are pressed upon the blank as it passes out to guide and steady it by the springs *p p*, which yield to allow the jaws to open to permit the head of the blank to pass through on its way from the trough to the gripping-nippers. The blank is thus pushed out of the trough when the latter is over the middle of the bench and the blank and feeding-punch are in a line with the axis of the mandrel, that the blank as it leaves the trough may enter straight into the grooves between the jaws of the gripping-nippers and press back the discharging-punch L, whose spring yields to permit it to retreat before the blank. After a blank has thus been transferred from the trough to the nippers the trough is immediately moved by suitable mechanism over to the side of the bench beneath a hopper to receive another blank, which in turn is carried into line with the axis of the mandrel and transferred into the jaws of the nippers. Simultaneously with the movement of the feeder toward the hopper a tube, P, is moved toward the nippers until its upper extremity is brought into line with the blank being dressed, to receive it when dressed and discharged from the gripping-jaws, and to conduct it into a box or other suitable receptacle. Neither the hopper to contain the supply of undressed blanks nor the mechanism for delivering them to the feeding-trough need be here described, as they form no part of the invention herein claimed.

The feeding-punch $M^2$ has depending from its under side, through a slot in the stock M, a boss, *r*, with a recess formed in it to receive the upper extremity of a lever, Q, whose lower extremity is pivoted to a bracket, *q*, on the leg of the bench A. This lever is connected near its middle with one extremity of a horizontal rod, Q′, whose opposite extremity is forked to embrace the shaft K which guides it, and across which it slides back and forth. This extremity of the rod has a short lateral arm, $Q^2$, depending from it within the range of motion of a cam, $Q^3$, on the upright shaft K, so that as the cam turns it will push the rod Q′ and lever Q with the feeding-punch $M^2$ backward from the gripping-nippers D and hold it in that position until the cam has passed the arm $Q^2$, when a helical spring, $Q^4$, acting through the rod Q′ and lever Q, forces the punch $M^2$ through the feeding-trough, and thrusts before it a blank from the trough into the jaws of the gripping-nippers.

At the front extremity of the slot $Q^3$ (through which the lever Q, that gives motion to the feeding-punch $M^2$, passes) a snug projects from the top of the bench. In this snug a set-screw is arranged to limit the movement of the lever Q and that of the punch $M^2$ toward the gripping-jaws; consequently this set-screw gages the distance which the screw-blank is intruded between the gripping-jaws and the distance which it is left projecting therefrom. This gaging is a point of very considerable importance, especially in machines for dressing the heads of screw-blanks, as it admits of the head of the blank being readily set exactly in range with the cutter that dresses it, so that the cutter-holder may be made solid and firm, and the various cutters clamped firmly in a fixed seat in the holder, instead of being clamped to an adjustable seat at the expense of firmness and solidity, although, owing to the unavoidable differences in the shapes of different cutters and of different parts of the same cutter, it seldom happens that two cutters can be placed in the holder with their edges in the same position, or that the same cutter can be taken out of the holder, sharpened, and replaced with its edge in the same position in an unadjustable tool-holder, and as adjustable tool-holders cannot easily be made to hold the tool with sufficient firmness, and are troublesome to adjust, (as they must of necessity be adjusted if the blanks are set in an invariable position in the gripping-jaws,) the simple adjustment of the feeding-punch, so as to allow its end to approach within a greater or less distance of the face of the gripping-jaws to insert the blank in a position adjusted to that of the cutting tool, saves labor and expense and dispenses with much of the skill that would otherwise be required for working the machine. When this or any equivalent arrangement for feeding the blank into the gripping-jaws is combined, as herein described, with such jaws fitted with a spring discharging-punch in a machine for dressing screw-blanks, the machine will thereby be adapted to receive and discharge blanks of different lengths, and will also have the capability of bringing such blanks into positions adjusted to those of the cutting-edges of different tools.

As the mechanism for operating the tool-holder forms no part of the invention claimed under this patent, it need not be here described. Moreover, it is well understood by all who are conversant with the construction and working of screw machinery.

On the lower part of the bench a driving-shaft is mounted in suitable boxes. This shaft carries a pulley that drives the mandrel by means of a belt which encircles both. On the rear end of the mandrel, behind the puppet-head, a second pulley is formed, that by means of a belt drives a pulley on a counter-shaft. The counter-shaft carries a worm-screw that gears into a worm-wheel, by which the cam-shaft is turned.

When the machine is put in operation, the parts herein described will perform their various movements in the following order: The toggle-levers are flexed by the backward movement of the horizontal bar F′, on the head of which they are jointed, to open the jaws. The feeding-trough, which meanwhile has received a blank from the hopper, is brought into line with the axes of the mandrel, and the blank is forced by the feeding-punch out of the feeding-trough into the grooves in the jaws of the nippers, and against the discharging-punch, which yields to permit the blank to enter. The toggles are now, by the return movement of the bar, extended to close the jaws upon the blank, and this movement of the bar is continued until the toggles are pushed slightly beyond a straight line and rest against the stops or holdfasts *x x* on the shanks D D′, in which position they stand locked to hold the shanks separated and the jaws firmly closed upon the blank. The feeder now moves to one side and the tool-holder is brought forward to bring the tool into contact with and to dress the blank, which is revolving with the jaws. When the blank is dressed, the cutter is withdrawn, the jaws opened again by the flexing of the toggles, and the blank liberated and discharged into the receiving-tube by the punch L. The machine is now ready to receive another blank to be dressed by a repetition of this operation.

The said improvement has been described as applied to machinery specially adapted to shaving the heads of screw-blanks; but it is evident that it may be applied to machinery for performing other operations in dressing screw-blanks.

The mechanism for imparting motion to the several moving members of the machine and for directing their movements may also be varied. Thus, for example, the feeder may have a longitudinal alternating movement, instead of a lateral alternating movement. The hopper would of course have to be adapted to this modification.

What is claimed under this patent as the invention of the said CULLEN WHIPPLE is—

A feeding-punch and mechanism for causing it to approach within different distances of the gripping-jaws, gripping-jaws adapted to receiving and holding screw-blanks in variable positions and of different lengths, in combination with a suitable tool-holder and cutting-tool, substantially as herein set forth.

In testimony whereof the said company has hereunto signed its name and affixed its seal.

NEW ENGLAND SCREW COMPANY, [L. S.]
By HENRY L. KENDALL,
*Agent.*

Witnesses:
P. H. WATSON,
HENRY BALDWIN, Jr.